2,725,311
Patented Nov. 29, 1955

2,725,311

PROCESS FOR TREATMENT OF CELLULOSIC MATERIALS TO IMPART FLAME RESISTANCE THERETO AND ARTICLES PRODUCED THEREBY

Duane L. Kenaga, Midland, and Arthur J. Erbel, Bay City, Mich., assignors to The Dow Chemical Company, Midland, Mich., a corporation of Delaware No Drawing. Application May 20, 1953,
Serial No. 356,307

9 Claims. (Cl. 117—136)

This invention relates to the treatment of normally flammable cellulosic materials to render the same fire retardant. More particularly it relates to the treatment of cellulosic materials such as wood, paper, and textiles made from cotton and regenerated cellulose that are exposed to atmospheric conditions with a water, fire, and weather resistant composition containing a bis-(haloalkyl)haloalkane phosphonate.

Because of its ready availability, ease of fabrication, and other reasons, wood is still widely used in construction of bridges, trestles, wharves, mine shafts, and other structures. In many such applications costly measures are required to prevent and to extinguish fires. The use of oil-soluble wood preservatives is necessary in many instances to prevent decay of the wood. Such preservatives frequently increase the susceptibility of the wood to combustion. It would be desirable if a material could be found that would be compatible with wood preservatives and would also render the wood fire retardant. Many solutions to the problem of raising the ignition temperature of wood have been presented. Some of those methods involve coating the wood surface with a fire retardant composition. However, in such a process when the wood is cut or trimmed, the freshly exposed surfaces are no longer protected and require a new treatment. Other methods use water soluble inorganic salts impregnated into the wood. Those salts are incompatible with the common oil soluble preservatives and, in addition, are easily leached out of the wood by standing water or by rain. Still other processes precipitate a water insoluble resin within the fibrous structure of the wood. Such processes, however, affect the important structural properties of the wood.

There are many applications for cellulosic materials other than wood, however, which also require a water and weather resistant, fire retardant treatment. Among such materials may be mentioned textiles made from cotton and from regenerated cellulose, and paper.

The provision of a composition for rendering normally flammable cellulosic materials fire retardant is the principal object of this invention.

A further object is the provision of a composition for treating cellulosic materials which is insoluble in water and is weather resistant.

A still further object is the provision of a fire retardant composition for wood that is compatible with the common oil-soluble wood preservatives.

The above and other related objects are accomplished by impregnating the cellulosic material with a solution of a bis-(omega-monohaloalkyl)-omega-monohaloalkane-phosphonate in a volatile solvent. After impregnating the solvent may be removed from the cellulosic material leaving the phosphonate uniformly distributed throughout the cellulosic material.

The phosphonates which may be used in accordance with this invention are those in which the alkyl and alkane groups contain 2 or 3 carbon atoms and in which the halogens are chlorine or bromine. As preferred compounds may be mentioned bis-(2-bromoethyl)-2-bromoethane phosphonate and bis-(2-chloroethyl)-2-chloroethane phosphonate.

These compounds are easily prepared by adding phosphorous trihalide to an alkylene oxide preferably in a solvent, and, thereafter, raising the temperature of the reaction mixture to 150° C. or higher to cause a rearrangement of the phosphite to a phosphonate. The use of a solvent is not necessary, but better control of the reaction is possible when one is used. As suitable solvents may be mentioned o-dichlorobenzene or aromatic mineral spirits. The yields of the phosphonates when prepared in this manner are almost quantitative so that in many cases when the above solvents are used, the resulting solution may be employed directly for treating the cellulosic articles.

The solvents used in the impregnation step should be capable of dissolving the phosphonates of this invention in the concentrations required and should be easily volatilized. As examples of suitable solvents may be mentioned orthodichlorobenzene, aromatic mineral spirits, and ethanol.

The phosphonates may be used in any concentration in the volatile solvents, although for ease in impregnating the cellulosic material, it is preferred to use a 20 to 30 per cent solution. When less concentrated solutions are used, it is usually not possible to deposit sufficient phosphonate in the material to render the material fire retardant. More concentrated solutions are more difficult to prepare and in such cases more than the required amounts of the chemicals are incorporated into the cellulosic material. This does not adversely affect the properties of the material, but is uneconomical.

The amounts of the compounds which should be retained by the cellulosic material to provide the desired fire retardancy may be varied within wide limits. When using wood, amounts as low as 2 pounds of phosphonate/cubic foot of wood give some fire retardancy. It is preferred however, to use from 3 to 6 pounds phosphonate/cubic foot of wood. When textiles or paper are to be impregnated, the preferred amount of the phosphonate is from 10 to 30 per cent of the weight of the treated material, although fire retardancy may be noticed with lesser quantities.

The impregnation of wood may be accomplished by any known process, such as the full cell pressure process, empty cell process, or by soaking. The type of process used will depend on the end use of the wood, the species and condition of the wood and by other factors well known to persons skilled in the wood impregnation art. After treatment the volatile solvent is removed by air seasoning the wood or by known solvent removal processes.

The impregnation may also be carried out in conjunction with a wood preservative treatment. In this instance the phosphonate is dissolved in the oil such as a petroleum-creosote solution that is to be used as wood preservative. The impregnation can then be carried out by the processes previously mentioned.

Textiles and paper may be rendered fire-retardant by dipping and soaking the materials in the previously described solutions. After soaking, the materials may be dried in air or by other known methods. The compounds of this invention do not alter the feel or hand of textiles nor do they seriously impair the properties of textiles or paper.

The compounds which are useful in this invention are insoluble in water and therefore are not leached out of the cellulosic materials by rain or by normal periods of standing in water. The compounds are stable under normal atmospheric conditions.

Cellulosic materials treated with the compounds of this invention successfully prevent the propagation of flames when the source of ignition is removed, and there is no afterglow when the flames are extinguished.

The invention will be more apparent from the following illustrative examples.

EXAMPLE 1

Blocks of ponderosa pine sapwood ½ inch by ½ inch by 3 inches were treated with a 25 per cent solution of bis-(2-bromoethyl)-2-bromoethane phosphonate in aromatic mineral spirits ("Penola 100"). The impregnation was accomplished using a modified full cell process which used atmospheric pressure instead of the superatmospheric pressure normally used. The impregnation was carried on until 6 pounds of phosphonate was retained per cubic foot of the wood. The wood blocks were then allowed to season in the air for one month to remove substantially all of the solvent. They were then tested according to the procedure described in ASTM test E160–50. In that test 24 blocks are piled in a wire crib and a calibrated Meker burner placed under the crib for 3 minutes. The times required for the flames to cease, and for glowing to cease after the flame is removed are noted. The blocks are then weighed and their loss in weight recorded.

When the blocks treated in this example were subjected to the above-described crib test, flaming ceased after 2 minutes; there was no afterglow, and the blocks had lost 40 per cent of their weight.

By way of contrast, when blocks were treated similarly using tris-(2-chloroethyl)-phosphate they were found to have lost 66 per cent of their weight. The blocks continued to burn for 4.5 minutes and there was no afterglow.

EXAMPLE 2

Blocks of wood similar to those described in the preceding example were treated with bis-(2-chloroethyl)-2-chloroethane phosphonate. After treating to a retention of 4.5 pounds/cubic foot and testing according to the method of Example 1, the blocks burned for only 2.5 minutes and were self-extinguishing with no afterglow.

EXAMPLE 3

Blocks of wood similar to those in Example 1 were treated by the modified full cell process with bis-(2-bromoethyl)-2-bromoethane phosphonate to a retention of 4.3 pounds of phosphonate per cubic foot of wood. These blocks were then tested according to the method of Example 1, and were found to have lost 55.5 per cent of their weight. Similarly treated blocks were placed under running distilled water for 48 hours, dried, and subjected to the same test. They were found to have lost 67.5 per cent of their weight.

By way of contrast, when blocks were treated in a similar manner using a commercially available fire retardant composition consisting of 40 parts boric acid and 60 parts borax to a retention of 4.8 pounds per cubic foot of wood and tested by the above mentioned procedure, the blocks were found to have lost 55 per cent of their weight. Similarly treated blocks were placed under running distilled water for 48 hours and dried, they had lost 94 per cent of their weight.

EXAMPLE 4

Twelve inch squares of 1/20 inch birch face veneer were cut and treated with the compounds of this invention and with other similar compounds dissolved in aromatic mineral spirits. The impregnation of the panels was accomplished by soaking in the solution for 2 minutes then allowing them to season in air for 24 hours to remove the aromatic mineral spirits.

The panels were then subjected to an inclined plane flame test. In that test, a 12 inch square panel of wood is placed on a wire rack so as to be at 45 degrees to the horizontal. A small cup holding one milliliter of alcohol is placed ¼ inch below the veneer. The alcohol is ignited and the flame allowed to impinge on the veneer. The effectiveness of the compounds as fire retardants for the veneer was rated according to an arbitrary scale which included the time for the flame to penetrate through the veneer, the amount of area charred, and the time for the flames to extinguish themselves. According to this rating 0 means no combustion, 1 means the flames were self extinguishing, 2 means the flames continued but with evident retardency, and 3 means flaming never ceased.

The results of the above test on the compounds used are listed in Table I.

*Table I*

| Compound | Concentration (Percent by Wt. of Wood) | Retarding Characteristics |
|---|---|---|
| Bis-(2-bromoethyl)-2-bromoethane phosphonate | 2.2 | 0 |
| Bis-(2-chloroethyl)-2-chloroethane phosphonate | 2.2 | 0 |
| Bis-(3-chloropropyl)-3-chloropropane phosphonate | 2.1 | 2 |
| Diethyl 2-bromoethane phosphonate | 5.1 | 3 |
| Triphenyl phosphate | 2.9 | 3 |
| Tetrabromobutane | 4.1 | 3 |
| N''(2,4,6-tribromophenyl)-N,N,N',N'-tetramethyl phosphoramide | 2.5 | 3 |

EXAMPLE 5

Southern pine sapwood stakes ¾ inch by ¾ inch by 18 inches were treated with varying amounts of bis-(2-bromoethyl)-2-bromoethane phosphonate and pentachlorophenol dissolved in an aromatic petroleum oil (Root No. 102E oil). The stakes were impregnated by soaking to a retention of 4 pounds phosphonate per cubic foot of wood. The stakes were allowed to season in air for 1 day.

Each stake was planted vertically in a pail of sand to a depth of 6 inches and 4 grams of wood chips were stacked against each stake on the surface of the sand. After igniting the chips, the length of time for the flame to spread from the bottom of the stake to the top, the total length of time of burning, and the loss in weight of the 12-inch portion exposed to the flame were measured. The results of these tests are listed in Table II.

*Table II*

| Solution | Absorption (lbs./Ft.³) | Time for Flame to reach top (mins.) | Total Flaming period (mins.) | Percent Wt. loss of 12 in. Vol. |
|---|---|---|---|---|
| Oil¹ | 3.6 | 0.5 | 9.5 | 69.8 |
| 5% Pentachlorophenol 95% oil | 4.5 | 0.5 | 7.4 | 33.4 |
| 5% Pentachlorophenol 5% Bis-(2-bromoethyl)-2-bromoethane phosphate 90% Oil¹ | 3.3 | 4.1 | 11.8 | 38.9 |
| 5% Pentachlorophenol 10% Bis-(2-bromoethyl)-2-bromoethane phosphonate 85% Oil¹ | 2.8 | ² (note) | 4.4 | 8.1 |

¹ Aromatic petroleum oil (Root No. 102E oil).
² Flame failed to reach the top in the time of burning.

EXAMPLE 6

Stakes similar to those of Example 4 were treated with varying amounts of different fire retardant compositions. The compounds were dissolved in a mixture consisting of 45 per cent of a heavy petroleum oil equivalent to a #5 fuel oil and 55 per cent of a medium residue coal tar creosote at varying concentrations. The impregnation was carried out by a full cell pressure process to a retention of 15 to 25 pounds solution per cubic foot of wood. After treating, the stakes were placed upright in a cup. One milliliter of alcohol was placed in the cup and ignited. The losses in weight of the stakes are listed in Table III.

Table III

| Compound | Concentration (percent by wt.) | Loss in Weight after burning |
|---|---|---|
| Bis-(2-bromoethyl)-2-bromo-ethane phosphonate | 5 | 12.3 |
|  | 10 | 1.9 |
|  | 15 | 0.9 |
| Tris-(2-chloroethyl)-phosphate | 5 | 54.9 |
|  | 10 | 19.7 |
|  | 20 | 2.2 |
| Triphenyl phosphate | 5 | 55.7 |
|  | 10 | 54.7 |
|  | 20 | 6.0 |
| Tricresyl phosphate | 10 | 58.1 |

It is seen that the compound of this invention (first item in Table III) was far superior to any of the others.

EXAMPLE 7

Strips of canvas duck were dipped into a 25 per cent solution of bis-(2-bromoethyl)-2-bromoethane phosphonate in ethanol. The strips were dried in air and were than found to contain 28.4 per cent of the phosphonate. When these treated strips were exposed to the blue flame of a microburner, and the burner then removed, they were found to be self-extinguishing and exhibited no afterglow. The hand of the treated strips was not appreciably altered.

The compounds of this invention also exhibit some toxicity to certain microorganisms, many of which tend to destroy cellulose. This antimicrobial effect is illustrated by the following examples.

EXAMPLE 8

A solid agar medium saturated with bis-(2-bromoethyl)-2-bromoethane phosphonate was made up. A streak was made across the surface of this medium with *Aspergillus terreus*, a common cellulose destroying microorganism. The phosphonate was found to inhibit the growth of the organism. In the same manner the growth of *Rhizopus nigricans* was found to be inhibited, indicating that the treated articles of this invention have a measure of protection against fungous attack.

EXAMPLE 9

Several samples of a medium were prepared and each was inoculated with one of the following microorganisms: *Salmonella typhosa, Staphylococcus aureus, Aspergillus terreus,* and *Rhizopus nigricans*. Known concentrations of the compounds of this invention were added to the media and the inhibition of growth noted at the different concentrations. Growth inhibition in the case of each organism was noted at 0.5 per cent phosphonate.

We claim:

1. The process of rendering normally flammable cellulosic material fire retardant comprising the impregnation of said cellulosic material with a solution consisting of from 5 to 40 per cent of a bis-(omega-monohaloalkyl)-omega-monohaloalkane phosphonate, in which the alkyl and alkane groups are alike and contain from 2 to 3 carbon atoms, and in which the halogens are selected from the group consisting of chlorine and bromine, and correspondingly from 95 to 60 per cent of a volatile solvent; and thereafter removing substantially all of said solvent.

2. The process as claimed in claim 1 in which the phosphonate is bis-(2-bromoethyl)-2-bromoethane phosphonate.

3. The process as claimed in claim 1 in which the phosphonate is bis-(2-chloroethyl)-2-chloroethane phosphate.

4. An article of manufacture comprising a normally flammable cellulosic material and a bis-(omega-monohaloalkyl)-omega-monohaloalkane phosphonate in which the alkyl and alkane group are alike and contain from 2 to 3 carbon atoms, and in which the halogens are selected from the group consisting of chlorine and bromine.

5. An article of manufacture as claimed in claim 4 in which the normally flammable cellulosic material is wood.

6. An article of manufacture as claimed in claim 5 in which the bis-(omega-monohaloalkyl)-omega-monohaloalkane phosphonate is present in amounts greater than 2 pounds per cubic foot of wood.

7. An article of manufacture as claimed in claim 5 in which the phosphonate is bis-(2-bromoethyl)-2-bromoethane phosphonate.

8. An article of manufacture as claimed in claim 5 in which the phosphonate is bis-(2-chloroethyl)-2-chloroethane phosphonate.

9. The process of rendering normally flammable cellulosic material fire retardant comprising the impregnation of said cellulosic material with a solution containing from 5 to 40 per cent of a bis-(omega-monohaloalkyl)-omega-monohaloalkane phosphonate, in which the alkyl and alkane groups are alike and contain from 2 to 3 carbon atoms, and in which the halogens are selected from the group consisting of bromine and chlorine.

References Cited in the file of this patent
UNITED STATES PATENTS

| | | |
|---|---|---|
| 2,436,141 | Goebel | Feb. 17, 1948 |
| 2,559,754 | Brittles | July 10, 1951 |